Feb. 21, 1939.  G. M. TURNER  2,148,090
STANDARDIZED SHOP EQUIPMENT
Filed Sept. 14, 1935  2 Sheets—Sheet 1
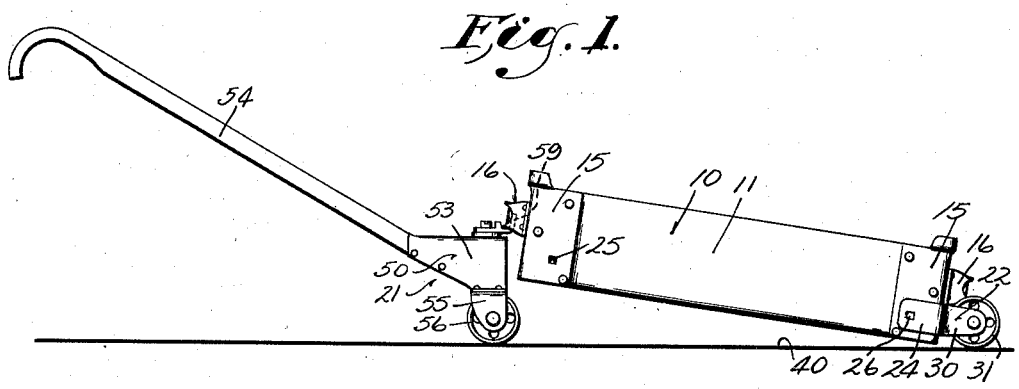
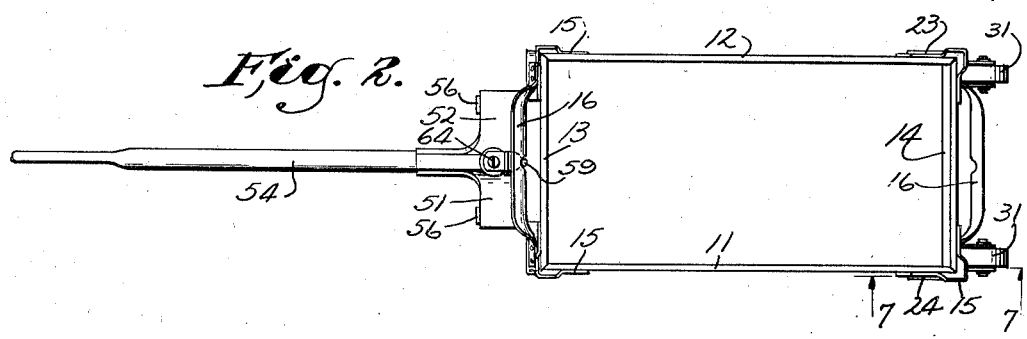
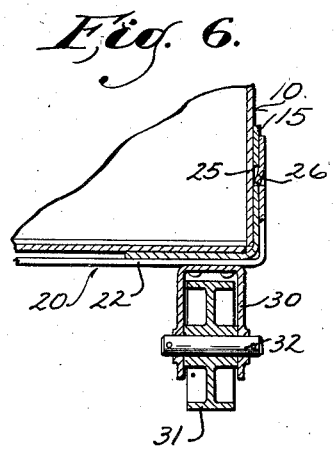
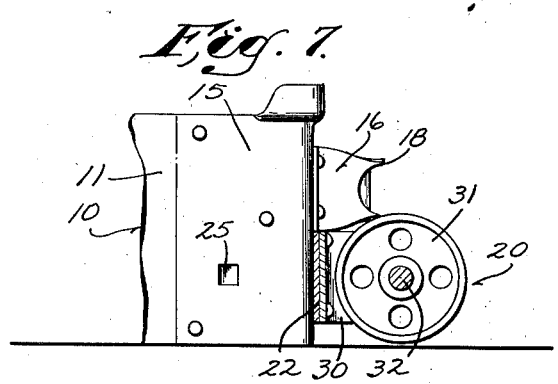
INVENTOR
Giles M. Turner
BY
Wheeler, Wheeler and Wheeler
ATTORNEYS Feb. 21, 1939. G. M. TURNER 2,148,090
STANDARDIZED SHOP EQUIPMENT
Filed Sept. 14, 1935 2 Sheets-Sheet 2
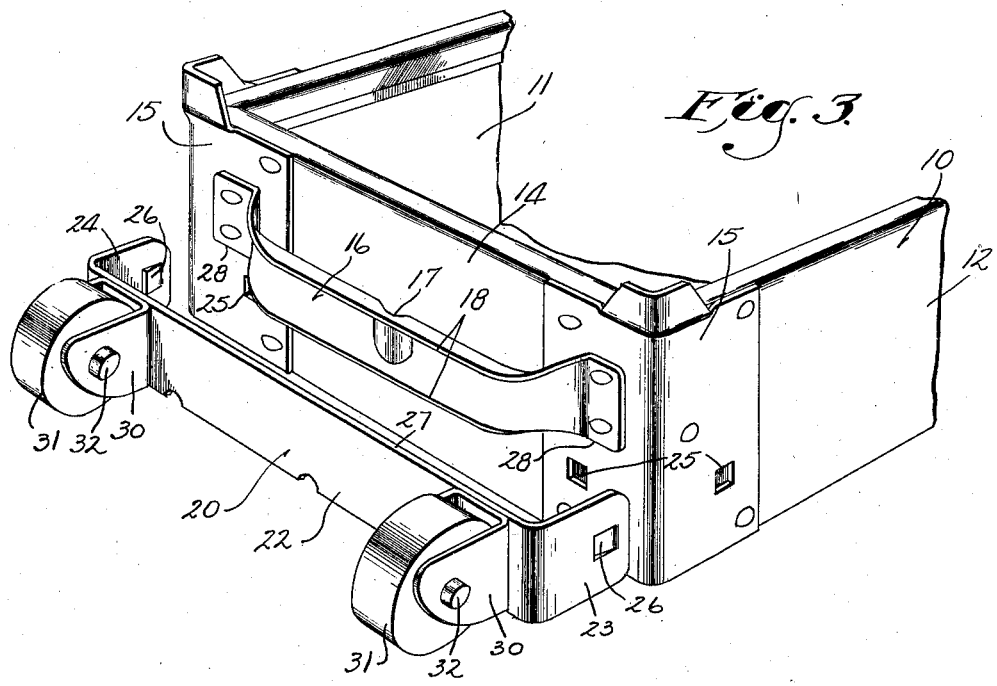
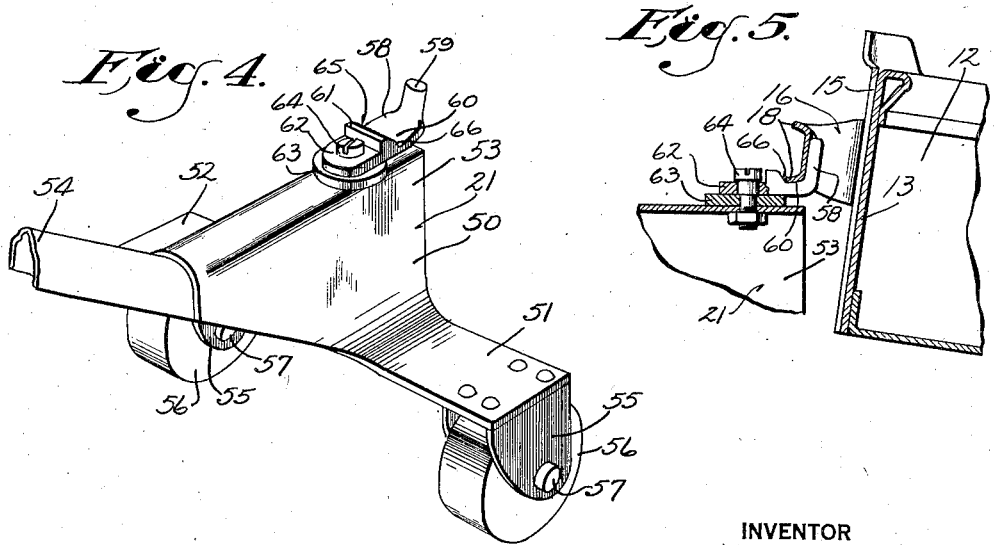
INVENTOR
Giles M. Turner
BY Whaley, Wheeler & Wheeler
ATTORNEYS Patented Feb. 21, 1939

2,148,090

UNITED STATES PATENT OFFICE 2,148,090

STANDARDIZED SHOP EQUIPMENT

Giles M. Turner, Milwaukee, Wis.

Application September 14, 1935, Serial No. 40,559

2 Claims. (Cl. 280—46)

My invention relates to improvements in standardized shop equipment.

It is the primary object of the invention to render a standardized and normally manually portable tray, drawer, or box more readily portable under heavy loads through the provision of a freely mountable and detachable wheeled unit or dolly which will engage the floor in supporting relation to the tray only when the tray or drawer is slightly tilted, and which will in no manner interfere with the manual lifting of the tray or its use or storage or filing in tiers.

More particularly stated, it is the object of my invention to provide a creeper dolly for one end of a tray and a lifting dolly for the other end of such a unit, whereby to convert the box into a transport unit.

It is also an object of my invention to provide accessory wheel elements for the purposes above described which are subject to easy and quick attachment to or detachment from the tray without special tools, and to provide means whereby the advantages of a wheeled unit for transport purposes may be obtained without lifting heavy loads more than to a sufficient height to clear the supporting surface.

In the drawings:

Figure 1 is a side elevation of my tray with my new creeper dolly and lifting dolly engaged therewith.

Figure 2 is a plan view of the structure shown in Figure 1.

Figure 3 is a perspective of one end of my standardized tray with my new creeper dolly in position to be forced into engagement with the drawer.

Figure 4 is a perspective of my lifting dolly.

Figure 5 is a detail of a pivot bolster for my lifting dolly in engagement with a handle of a tray.

Figure 6 is a horizontal section through a corner of the tray and a portion of my creeper dolly.

Figure 7 is a section on line 7—7 of Figure 2.

Like parts are identified by the same reference characters throughout the several views.

As stated above, one of my standard units for factory equipment is a tray, drawer, or box 10, which I shall hereinafter refer to as a tray, it being understood that my invention relates to attachments for any similar form of storing, carrying, or transporting element, wherein the element must be kept substantially horizontal and may not be tilted to an angle such that articles on the tray will be dislodged over shallow walled margins.

My standardized unit is provided with side walls 11 and 12 and end walls 13 and 14, with a corner brace 15 at each corner, whereby to reenforce the tray. A handle 16 secured to the corner braces 15 is provided centrally with a depression 17 and outwardly extended margins 18, since the handle is formed of metal with a channel shape, as shown clearly in the drawings.

Such a tray as above described may be filled with exceedingly heavy material which would tax the strength of any workman were he to attempt to lift it by the handles 16, and I therefore provide my new creeper dolly 20 and my lifting and steering dolly 21 for ready attachment to the tray 10, as will now be described.

Creeper dolly

I provide for connection with either end of the box 10 a dolly which I have termed a "creeper dolly", since it is constructed for use closely adjacent the floor or other supporting surface for the box 10, and this dolly is intended to provide for merely a slight elevation of the end 14 of the box, to which, for example, I have shown it attached.

My creeper dolly has a main spring frame 22 comprising a strap bent in a U shape to provide a stretcher across the end 14 of the box, and side embracing members 23 and 24 to bear against the corner reenforcing plates 15 of the box.

Each of the corner plates is provided with an aperture 25 spaced from the end of the box and positioned to receive a latch tongue 26 partially punched from portions 23 and 24 of the creeper dolly strap 22. Thus, when the creeper dolly is forcibly positioned to embrace one end and the adjacent side plates 15, the tongues 26 will snap into position in the latch apertures 25, and will prevent the removal of the creeper dolly from the box unless the tongues 26 are pried out of the apertures 25 by means of a bar or screw driver so used as to spring the side embracing portions of the strap outwardly to release the latch.

With the creeper dolly in position against the end of the tray the upper margin 27 of the strap 22 bears against the lower margin 28 of the handle 16 to receive directly the load of the tray and its contents.

Positioned at spaced points upon the strap 22 I provide brackets 30 into which are fitted creeper wheels 31 mounted upon pins 32. It will be noted that the brackets 30 are of considerable extent, whereby to position the pins 32 at some distance from the end 14 of the tray so that when the opposite end of the tray is raised a few inches above a supporting surface 40 the end 14 of the tray will also be raised on the supporting wheels sufficiently to clear small obstructions. It will also be noted that when the tray is positioned on a supporting surface 40 the creeper will not be subject to load in the course of its attachment to or detachment from the tray.

Stresses upon the clip 26 are light and include the retaining function performed by the flat end of the latch tongue and the supporting function for which the flat lower edge is responsible. There is no tendency for disengagement as the downward thrust of the weight of the tray and its contents is borne almost entirely by the abutment of the upper margin 27 of the strap 22 against the lower margins 28 of the ends of the handle 16.

*Lifting and steering dolly*

With the creeper dolly in place upon the end 14 of the tray 10, it is desirable not only to place a wheeled element under the end 13, but it is also desirable to elevate that end of the tray sufficiently to cause the end 14 to clear the supporting surface 40. I therefore provide a two-wheeled drawing, guiding, and lifting dolly 21, shown most clearly in Figures 1 and 4. I prefer to form the frame 50 of this dolly out of pressed metal to provide lateral extensions 51 and 52 extending from a central raised portion 53 which is substantially U-shaped in cross section. Forwardly and upwardly from this portion 53 of the frame 50 I extend a handle 54 of suitable length and configuration for easy handling by a workman.

The dolly 21 is provided with brackets 55 in which wheels 56 are mounted upon pins 57.

Upon the central raised portion 53 of the frame 50 I provide a hook 58, which includes a forwardly and upwardly extending spud 59, a weight-supporting table 60, a cam-shaped handle abutment 61, and a platform 62. This platform has a plane under surface to bear upon the plane upper surface of a turntable 63 secured to the top of the raised central portion 53 of the dolly. A king-pin 64 provides a pivot mounting for the entire hook 58, which may swing freely about pivot pin 64, special note being made, however, of the fact that the greater portion of the weight of the material in the hook 58 is eccentrically mounted, whereby to tend to center the entire hook 58 by gravity when the dolly is in inclined position.

The cam face 65, inclined downwardly toward the weight supporting table, is very slightly shouldered at 66, and it is against this shoulder that the edge 18 of handle 16 of the tray bears when the spud 59 of hook 58 is in the depression 17 of the handle. This is shown clearly in Figure 5. To thus engage the spud 59 with the handle the workman may tilt the dolly 21 by raising the handle 54, and because of the pendular motion of the hook 58 the spud 59 is naturally disposed in proper position to hook under handle 16 of the tray. A downward thrust on the handle 54 will then elevate the handle 16 and at the same time cause the outer margin 18 of handle 16 to abut the shoulder 65 and "cramp" the spud 59 into position in the depression 17. With the creeper dolly erect under the handle 16 the hook 58 cannot be displaced laterally on the handle 16.

The elevating motion incident to the lowering of the handle 54 when the hook 58 is engaged centrally with the handle 16 brings the axes of wheels 56 directly under the weight supporting table 60 or slightly rearwardly thereof toward the tray so that if a workman should accidentally release his hold upon the handle 54 the central raised portion 53 of the elevating dolly will contact the lower margin of the end 14 of the tray.

When the elevating dolly 21 is in engagement with the handle 16 the end 13 of the tray is elevated sufficiently to "clear" the lateral extensions 51 of the elevating dolly. Steering action therefore is easy and directional control in the hands of the workman is complete.

From the above description it will be apparent that a tray 10 may be converted into a transport unit with ease and facility, since a workman may place the creeping dolly in the position shown in Figure 3 and "kick" it into position, after which he may take the lifting and steering dolly, and by inclining the handle 54, may dispose the spud 59 in position under handle 16 with the spud opposite depression 17. By pulling the handle 54 downwardly into operating position, a lifting or elevating action is accomplished upon the hook 58, whereby to positively engage the central portion of the handle 16 upon the hook and at the same time raise the end 14 of the tray sufficiently to place the end 13 of the tray in load bearing relation to the wheels 31 of the creeper dolly.

The entire assembly is then a complete transport unit which may be moved and stored readily to a new location, where, if necessary, the workman may restore the tray to a position upon the floor or other supporting surface by tilting the handle 54 upwardly and thus lowering the end 13 of the box to the floor and disengaging the spud 59 from the depressed portion 17 of the handle. Simultaneously with such an operation the weight is removed from the wheels 31, and a simple prying action upon the portion 23 or 24 of the creeping dolly will unlatch the clips 26 from the depressions or apertures 25 in the sides of the braces 15 to permit of the release of the creeping dolly from the tray, whereupon the creeping dolly and the lifting and steering dolly are released for use with other trays or other standard units.

The creeping dollies may also be left in engagement with their respective trays without in any way interfering with any use to which they have heretofore been put. Both of the terminal handles are exposed to be grasped by the workman, and the wheels 31 may even facilitate the positioning of the tray in a storage tier or its removal therefrom.

I claim:

1. A tray normally supported flatly upon a supporting surface, said tray having recessed side portions and a handle at either end of the tray, a creeper dolly comprising a U-shaped frame having side members provided with clips receivable in the recesses, and a stretcher receivable under the handle and for abutment therewith, wheeled brackets secured to the stretcher and extending outwardly and rearwardly in non-load bearing relation when the tray is flatly supported upon said supporting surface, and a lifting dolly for engagement with the handle at the opposite end of the tray from the creeper dolly, whereby to lift the tray at an inclination above said supporting surface and to bring said creeper dolly into load bearing position and convert the entire tray into a transport unit.

2. A tray normally supported flatly upon a supporting surface, said tray having recessed side portions and a handle at either end of the tray, a creeper dolly comprising a U-shaped frame having side members provided with clips receivable in the recesses, and a stretcher receivable under the handle and for abutment therewith, wheeled brackets secured to the stretcher and extending outwardly and rearwardly in non-load bearing relation when the tray is flatly supported upon said supporting surface, and a steerable lifting dolly connected with the handle at the opposite end of the tray from the creeper dolly, whereby to elevate the tray at an inclination above said supporting surface and to bring said creeper dolly into load bearing position and convert the entire tray into a steerable transport unit.

GILES M. TURNER.